United States Patent
Huang et al.

(10) Patent No.: US 8,175,018 B2
(45) Date of Patent: May 8, 2012

(54) DATA SCHEDULING MODULE, METHOD, AND COMPUTER PROGRAM PRODUCT THEREOF FOR A WIRELESS COMMUNICATION APPARATUS

(75) Inventors: Shih-Chang Huang, Penghu County (TW); Chien Chen, Hsinchu County (TW); Rong-Hong Jan, Hsinchu (TW); Chih-Hsiang Ho, Taipei (TW); Yu-Hsiang Lin, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 537 days.

(21) Appl. No.: 12/369,471

(22) Filed: Feb. 11, 2009

(65) Prior Publication Data

US 2010/0142424 A1 Jun. 10, 2010

(30) Foreign Application Priority Data

Dec. 10, 2008 (TW) ................. 97148035 A

(51) Int. Cl.
*G08C 17/00* (2006.01)
(52) U.S. Cl. ....................... 370/311; 370/336
(58) Field of Classification Search .......... 370/311, 370/395.4, 395.41, 395.42, 395.43, 326, 370/335, 336, 342, 343, 345, 479, 480, 498, 370/537, 538, 540
See application file for complete search history.

(56) References Cited

U.S. PATENT DOCUMENTS

| | | | | |
|---|---|---|---|---|
| 7,397,818 B2* | 7/2008 | Restivo et al. | ................. | 370/329 |
| 7,660,279 B2* | 2/2010 | Brueck et al. | ................. | 370/328 |
| 2004/0085934 A1* | 5/2004 | Balachandran et al. | ....... | 370/335 |
| 2005/0220145 A1* | 10/2005 | Nishibayashi et al. | ........ | 370/474 |
| 2007/0177536 A1* | 8/2007 | Brueck et al. | ................. | 370/328 |
| 2008/0285670 A1* | 11/2008 | Walton et al. | ................. | 375/260 |
| 2009/0016275 A1* | 1/2009 | Liu et al. | ....................... | 370/329 |
| 2010/0002646 A1* | 1/2010 | Nishibayashi et al. | ........ | 370/329 |
| 2010/0074277 A1* | 3/2010 | Nishibayashi et al. | ........ | 370/474 |

OTHER PUBLICATIONS

Fig. 1 (prior art), prior to Feb. 10, 2009.
Fig. 2 (prior art), prior to Feb. 10, 2009.
Fig. 3 (prior art), prior to Feb. 10, 2009.
Fig. 4 (prior art), prior to Feb. 10, 2009.

\* cited by examiner

*Primary Examiner* — Chi H. Pham
*Assistant Examiner* — Kevin Mew
(74) *Attorney, Agent, or Firm* — Patterson Thuente Christensen Pedersen, P.A.

(57) ABSTRACT

A data scheduling module, a data scheduling method and computer program product thereof for a wireless communication apparatus are provided. The data scheduling method comprises the following steps: determining that the frame length of a second data transmission interval is not smaller than a frame length of a first data transmission interval; summing at least one first data and at least one second data according to the frame length of the second data transmission interval; calculating an average value according to the frame length of the second data transmission interval and the summed result; calculating an aggregate data transmission interval according to a data transmission capacity, the average value, and an integer adjusting value; and transmitting the at least one first data and the at least one second data via a plurality of frames in accordance with the aggregate data transmission interval.

24 Claims, 11 Drawing Sheets

DATA SCHEDULING MODULE, METHOD, AND COMPUTER PROGRAM PRODUCT THEREOF FOR A WIRELESS COMMUNICATION APPARATUS

This application claims priority to Taiwan Patent Application No. 097148035 filed on Dec. 10, 2008.

CROSS-REFERENCES TO RELATED APPLICATIONS

Not applicable.

BACKGROUND OF THE INVENTION

1. Field of the Invention

The present invention relates to a data scheduling module, a data scheduling method, and a computer program product thereof for a wireless communication apparatus. More particularly, the present invention relates to a data scheduling module, a data scheduling method, and a computer program product thereof for prolonging the sleep time of a wireless communication apparatus through data aggregation.

2. Descriptions of the Related Art

In terms of the range of coverage, wireless network schemes currently available fall into the following categories: the Wireless Wide Area Network (WWAN), the Wireless Metropolitan Area Network (WMAN), the Wireless Local Area Network (WLAN), the Bluetooth, the Infrared (IR) wireless network and various other wireless network standards. Among these wireless network standards, WLAN has the widest application in daily life, some examples of which are the WLAN access points (APs) that do not require physical wiring and WLAN wireless network cards for use in home computers.

Wireless networks have higher flexibility than wired networks in terms of both deployment and use. Meanwhile, the use of the wireless network may also substantially reduce the cost of manpower and materials associated with conventional wired networks. However, albeit these advantages, the wireless networks still suffer from a number of limitations, such as instable data transmission range, low data transmission security, slow data transmission speed, etc.

Over recent years, consumers' environmental awareness has increased. As a result, "power-saving" features are important to be considered during the early design stages of various electronic products. The design and production of electronic products related to wireless networks are of course no exception. For example, the IEEE802.16e wireless network standard has proposed three power-saving modes for the users' choice in achieving power-saving objectives.

According to the first power-saving mode, a mobile station presets an initial sleep window early at the beginning of data transmission. At the end of the initial sleep window, the mobile station will receive a broadcast message from the base station, informing the base station to either transmit or not transmit data to the mobile station. If the base station is to transmit data, the mobile station leaves from the sleep mode to communicate with and receive data from the base station. Otherwise, if the base station has no data to transmit, the mobile station will stay in the sleep mode by doubling the sleep window to extend the sleep duration, thereby achieving an improved power-saving effect. This power-saving mode is mainly applicable to such network applications, such as webpage browsing or data access.

According to the second power-saving mode, the mobile station presets a sleep window and a listen window of a fixed length early at the beginning of a data transmission. The mobile station then transmits data to or receives data from a base station at regular intervals according to the preset listen window of a fixed length and keeps silent in the sleep window. Unless the mobile station is actively requested to leave from the sleep mode, it will continuously stay in the sleep mode. With the nature of the fixed sleep window, this power-saving mode is mainly applicable to network applications in a real-time and periodic nature and with fixed data traffic such as Voice over Internet Protocol (VoIP) or video streaming network applications.

According to the third power-saving mode, before entering the sleep mode, a mobile station transmits a notification message to the base station so that the base station is informed whether the mobile station is going to enter the sleep mode and the desired duration of the current sleep window. Then the base station acknowledges the request with the duration of the sleep window. When the current sleep window expires, the mobile station leaves from the sleep mode to resume normal operations. Because the third power-saving mode does not have the same periodic nature as in the aforesaid two power-saving modes, this power-saving mode is mainly applicable to the periodic management of mobile stations by a base station, for example, instructing a mobile station to make signal adjustments consistent with the base station at regular intervals.

FIG. 1 depicts the wireless network 1 of a prior art conforming to the IEEE802.16e wireless network standard and adopting the second power-saving mode described above. The wireless network 1 comprises a base station 101, a first mobile station 103 and a second mobile station 105. FIG. 2 is a schematic view illustrating data transmission between the base station 101 and the first mobile station 103. The base station 101 is going to transmit a plurality of data A, B, C, D, E of a first connection 201 and a plurality of data F, G, H of a second connection 203 to the first mobile station 103, in which the data A, B, C, D, E of the first connection 201 and the data F, G, H of the second connection 203 are both to be transmitted in a plurality of frames I, II, III, . . . , IX.

In particular, the base station 101 will transmit the plurality of data A, B, C, D, E in frames I, III, V, VII, IX at an interval of two frames (i.e. the data transmission interval is two frames), and transmit the plurality of data F, G, H in frames I, V, IX at an interval of four frames (i.e. the data transmission interval is four frames). Then, the base station 101 integrates the data A, B, C, . . . , H of the first connection 201 and the second connection 203 into a first time arrangement 205. Accordingly, the base station 101 will transmit the data A and F in frame I, the data B in frame III, the data C and G in frame V, the data D in frame VII, and the data E and H in frame IX.

Meanwhile, according to the aforesaid calculation results, the first mobile station 103 will have the antenna module powered off during the unused frames (i.e. frames II, IV, VI, VIII) of the first time arrangement 205.

FIG. 3 is a schematic view illustrating the data transmission between the base station 101 and the second mobile station 105. The base station 101 is going to transmit a plurality of data a, b, c, . . . , i of a third connection 301 and a plurality of data j, k, l, m, n of a fourth connection 303 to the second mobile station 105, in which the data a, b, c, . . . , i of the third connection 301 and the data j, k, l, m, n of the fourth connection 303 are also to be transmitted in the plurality of frames I, II, III, . . . , IX.

In particular, the base station 101 will transmit the plurality of data a, b, c, . . . , i in frames I, II, III, . . . , IX at an interval of one frame (i.e. the data transmission interval is one frame), and transmit the plurality of data j, k, l, m, n in frames I, III, V, VII, IX at an interval of two frames (i.e. the data transmission interval is two frames). Then, the base station 101 integrates the data a, b, c, . . . , n of the third connection 301 and the fourth connection 303 into a second time arrangement 305. Accordingly, the base station 101 will transmit the data a and j in frame I, the data b in frame II, the data c and k in frame III, the data d in frame IV, the data e and l in frame V, the data f in frame VI, the data g and m in frame VII, the data h in frame VIII, and the data i and n in frame IX.

Meanwhile, according to the aforesaid calculation results, no frame is left unused in the second time arrangement 305, so the second mobile station 105 is not allowed to power off the antenna module thereof.

According to the above descriptions, as long as there is data to transmit in a frame, the mobile station will have to power on the antenna module thereof for a fixed duration for data transmission purpose regardless of the size of the data. Therefore, the power of the mobile station will be excessively consumed if the data is fragmental. For example, in the first time arrangement 205 of the first mobile station 103, the amount of data transmitted in the frames III and VII is very small. Likewise, in the second time arrangement 305 of the second mobile station 105, the amount of data transmitted in the frames II, IV, VI and VIII is also very small. Even with such fragmentary data, the mobile stations 103, 105 still have to power on their antenna modules for a fixed duration for data transmission purpose, causing significant degradation of the power-saving effect.

On the other hand, when transmitting the data A, B, C, . . . , H of the first mobile station 103 and the data a, b, c, . . . , n of the second mobile station 105, the base station 101 processes the data A, B, C, . . . , H and a, b, c, . . . , n simultaneously depending on the data transmission capacity of the frames. As shown in FIG. 4, during the processing of all the aforesaid data, the base station 101 has to process an amount of data A, F, a, j in frame I that exceeds the data transmission capacity of the frame; an amount of data C, G, e, l in frame V that exceeds the data transmission capacity of the frame; and an amount of data E, H, i, n in frame IX that exceeds the data transmission capacity of the frame. When such a case occurs, the data j intended to be transmitted in frame I, the data l intended to be transmitted in frame V and the data n intended to be transmitted in frame IX will fail to be processed by the base station 101, causing a failure in the scheduling operation of the base station 101. As a consequence, the base station 101 has to force the first mobile station 103 or the second mobile station 105 to leave the power-saving mode, making it difficult to save power in the wireless network 1.

According to the above descriptions, the wireless network 1 of the prior art conforming to the IEEE 802.16e wireless network standard and adopting the second power-saving mode suffers from the following two drawbacks:

1. If there is data to transmit in frames corresponding to several connections of a single mobile station, the mobile station has to power on the antenna module thereof for a fixed duration for data transmission purpose regardless of the size of the data. If the data to be transmitted is insufficient to occupy the whole time window when the antenna module is powered on, the power of the mobile station will be excessively consumed in an idle status. As a result, there is a significant degradation of the power-saving effect.
2. When the number of mobile stations associated with a single base station increases, the data amount the base station processes will also increase considerably to cause a failure in the scheduling operation of the base station 101. This would force some of the mobile stations to leave the sleep mode to result in increased power consumption.

Accordingly, efforts still have to be made by the network equipment manufacturers and network service providers to improve the utilization factor of frames in the wireless networks and enhance the capability of a base station to process data of a plurality of mobile stations by solving the aforesaid two problems with the wireless networks conforming to the IEEE 802.16e wireless network standard and adopting the second power-saving mode.

SUMMARY OF THE INVENTION

One objective of this invention is to provide a data scheduling method for a wireless communication apparatus. The wireless communication apparatus transmits at least one first data at a first data transmission interval in a plurality of frames, transmits at least one second data at a second data transmission interval in the plurality of frames. Each of the frames has a data transmission capacity. The data scheduling method comprises the following steps: determining that a frame length of the second data transmission interval is not smaller than a frame length of the first data transmission interval; summing the at least one first data and the at least one second data according to the frame length of the second data transmission interval; calculating an average value according to the frame length of the second data transmission interval and the summed result; calculating an aggregate data transmission interval according to the data transmission capacity, the average value, and an integer adjusting value; and transmitting the at least one first data and the at least one second data via the plurality of frames at the aggregate data transmission interval.

Another objective of this invention is to provide a data scheduling module for a wireless communication apparatus. The wireless communication apparatus transmits at least one first data at a first data transmission interval in a plurality of frames, transmits at least one second data at a second data transmission interval in the plurality of frames. Each of the frames has a data transmission capacity. The data scheduling module comprises a comparison unit, a calculation unit and a transmission unit. The comparison unit is configured to compare a frame length of the second data transmission interval with a frame length of the first data transmission interval. If the frame length of the second data transmission interval is not smaller than the frame length of the first data transmission interval, the calculation unit sums the at least one first data and the at least one second data according to the frame length of the second data transmission interval, calculates an average value according to the frame length of the second data transmission interval and the summed result, and calculates an aggregate data transmission interval according to a data transmission capacity, the average value, and an integer adjusting value. The transmission unit transmits the at least one first data and the at least one second data via the plurality of frames at the aggregate data transmission interval.

This invention provides a computer program product storing a program which, when being executed, enables a data scheduling module to execute the aforesaid data scheduling method for a wireless communication apparatus described above.

In particular, by integrating the data to be transmitted through the individual frames corresponding to different connections of mobile stations, this invention reduces the number of times that the antenna modules of the mobile stations in sleep mode are powered on, thereby conserving power. Moreover, this invention enhances the capability of a base station to process the data of a plurality of mobile stations in sleep mode so that unnecessary power consumption of the mobile stations due to insufficient data transmission capacity of the frames is prevented.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, this invention will be explained with reference to embodiments thereof. This invention relates to a data scheduling module, a data scheduling method and a computer program product thereof for a wireless communication apparatus. However, the description of these embodiments is only for purposes of illustration rather than limitations. In the following embodiments and the attached drawings, elements unrelated to this invention are omitted from depiction; and the dimensional relationships among the individual elements in the attached drawings are illustrated only for ease of understanding, but not to limit the actual scale.

Figure 1:
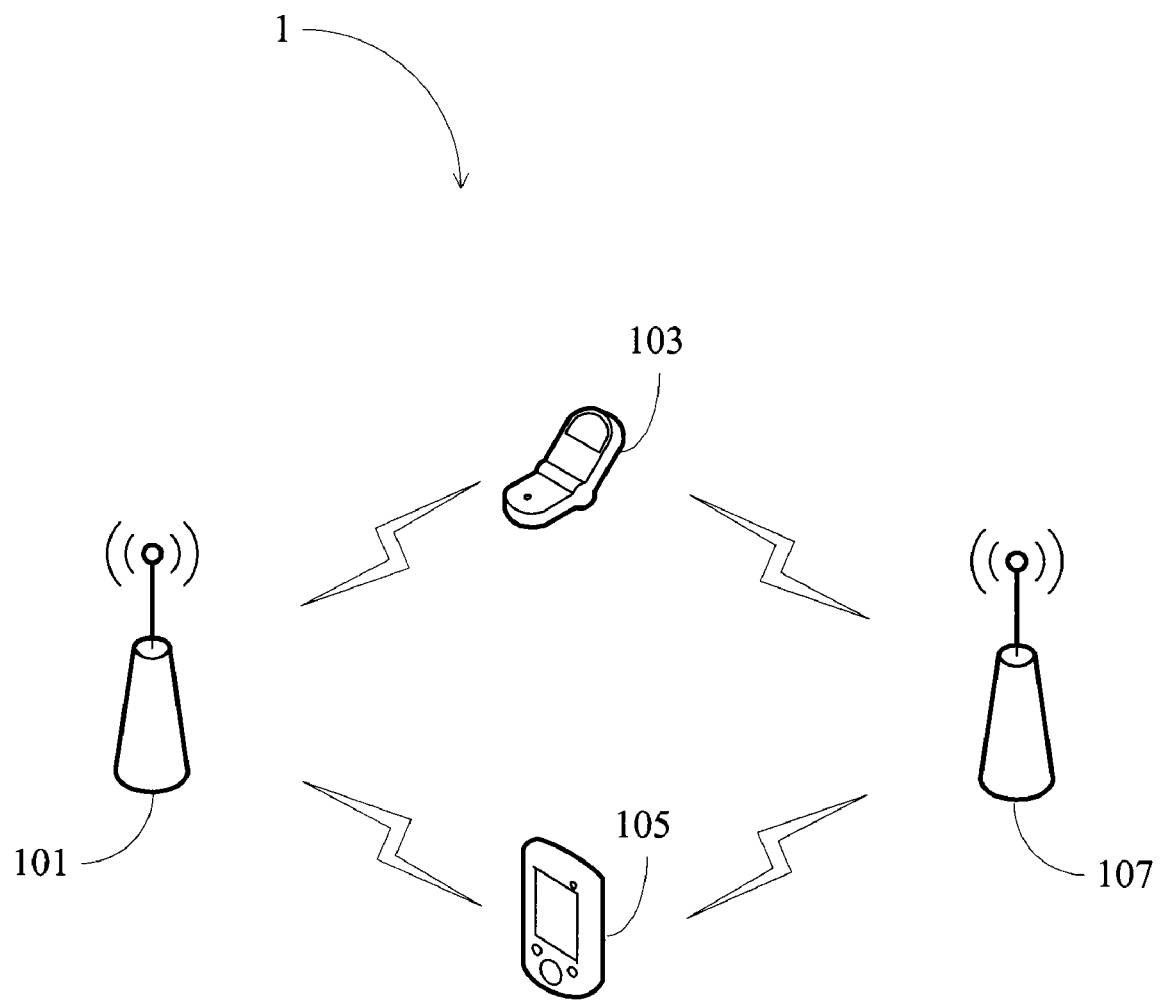
FIG. 1 is a schematic view of a wireless network of the prior art.
Figure 2:
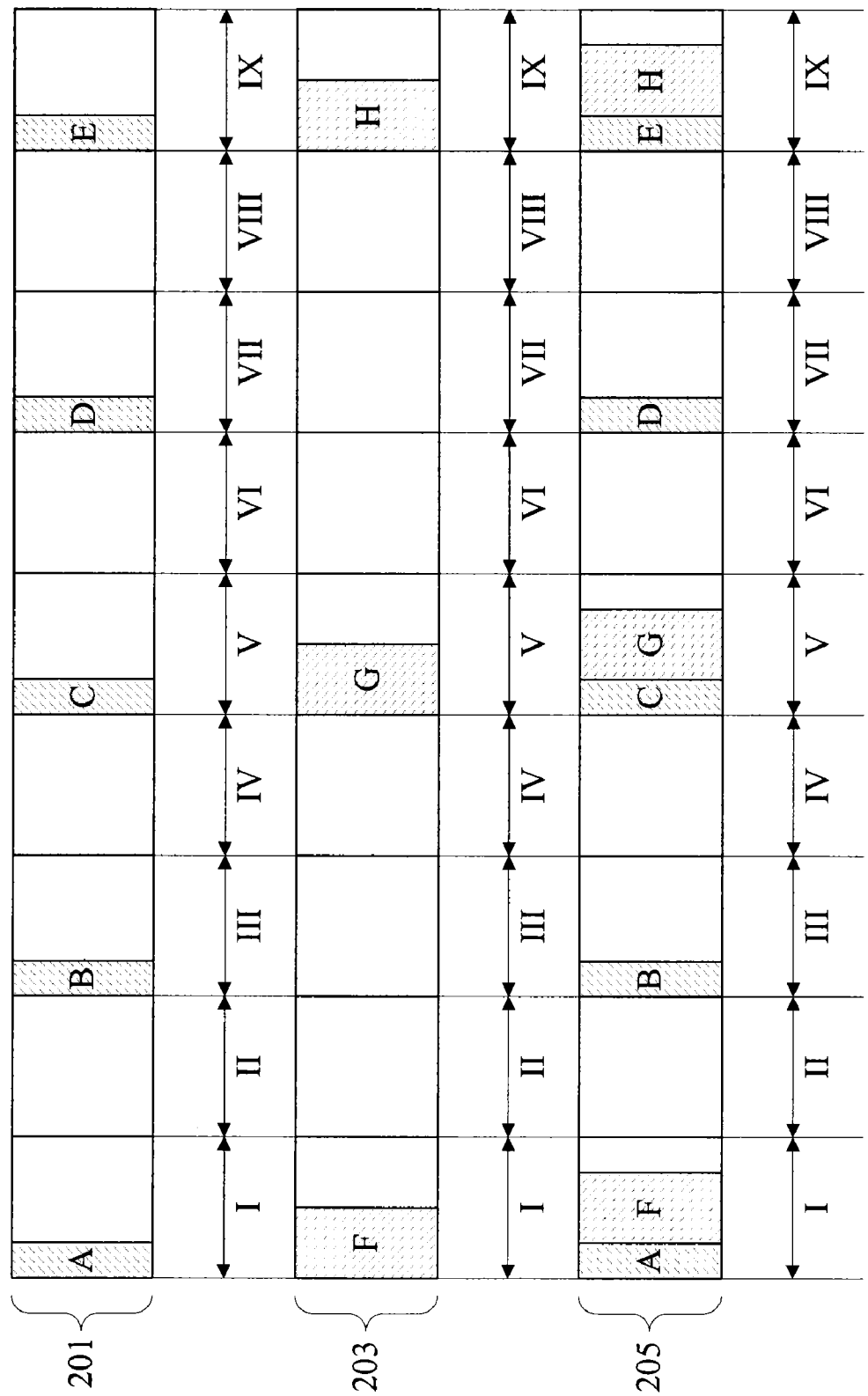
FIG. 2 is a schematic view illustrating the data transmission between a base station and a mobile station in the wireless network of the prior art.
Figure 3:
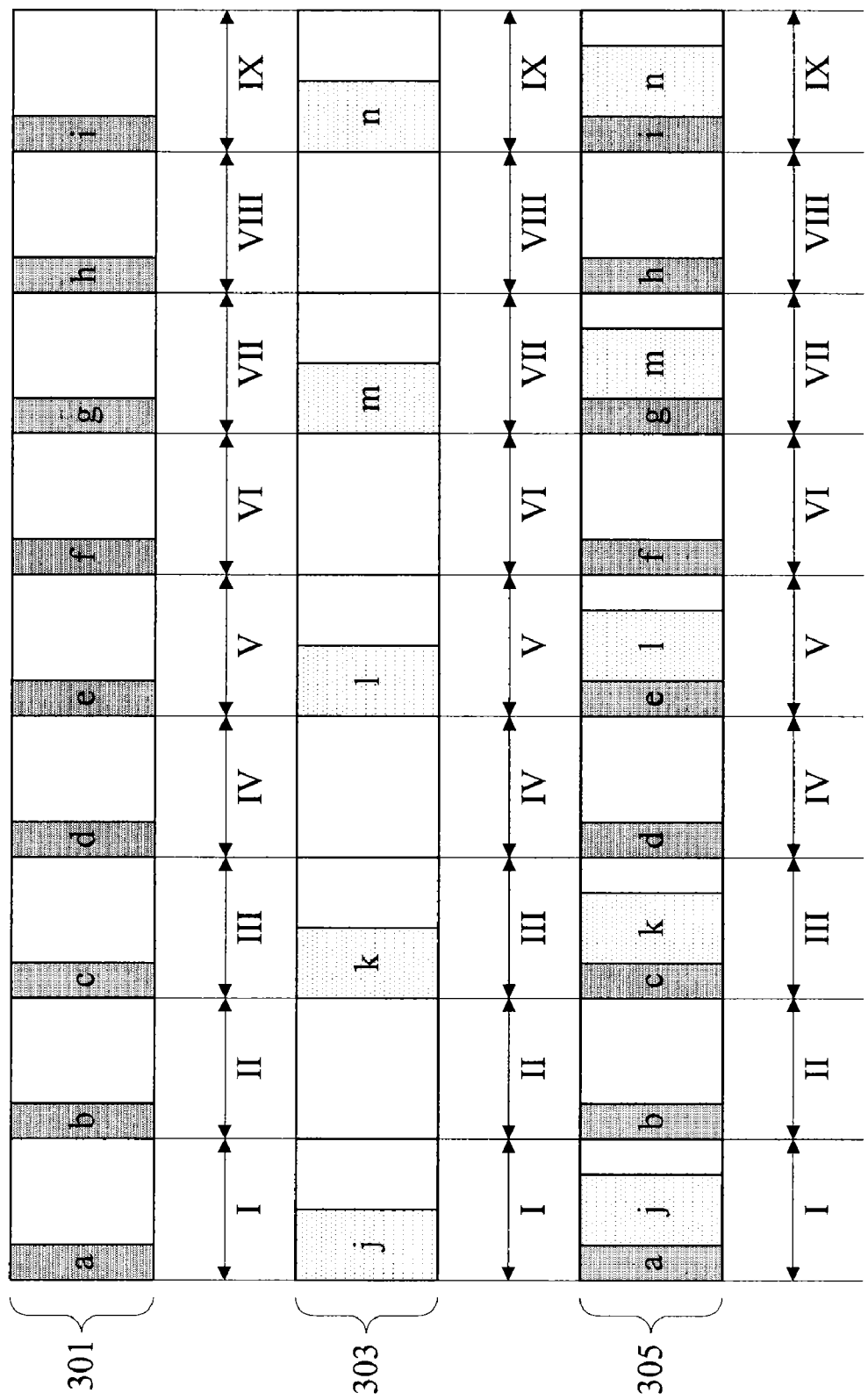
FIG. 3 is a schematic view illustrating data transmission between the base station and another mobile station in the wireless network of the prior art.
Figure 4:
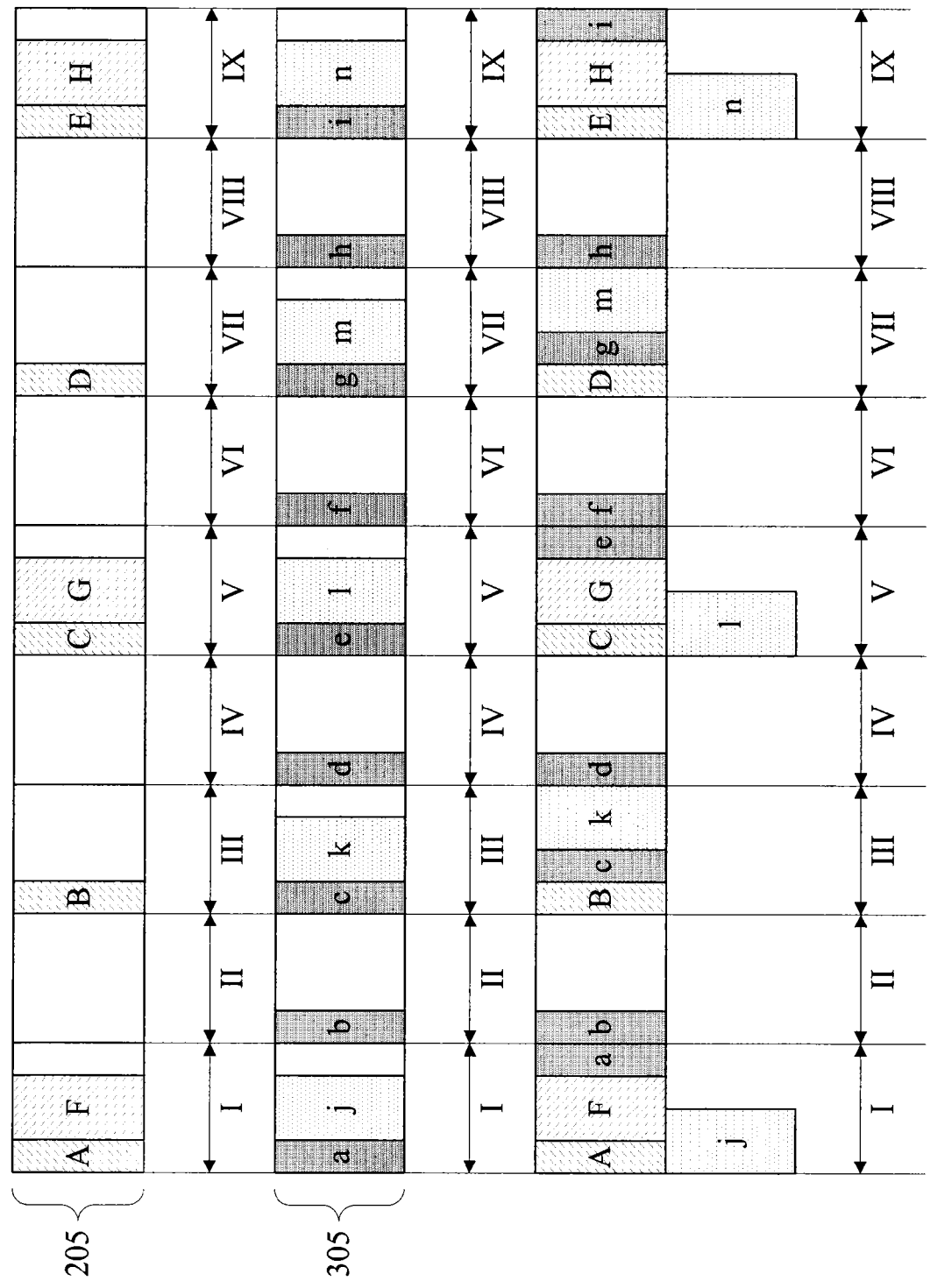
FIG. 4 is a schematic view illustrating the data transmission between the base station and the two mobile stations in the wireless network of the prior art.
Figure 5:
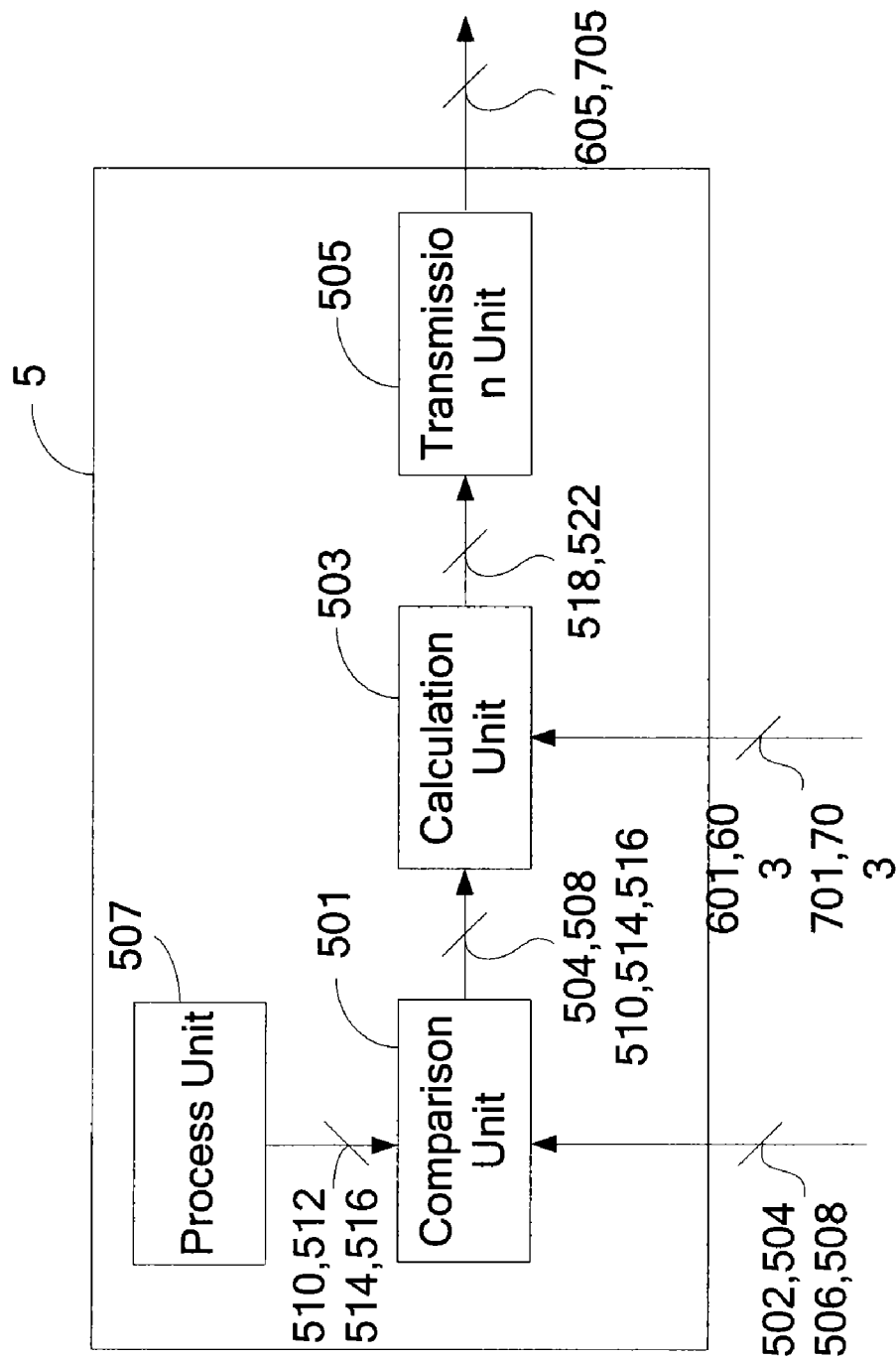
FIG. 5 is a schematic view of a first embodiment of this invention.

FIG. 5 depicts a first embodiment of this invention, which is a data scheduling module 5 for a wireless communication apparatus. The data scheduling module 5 comprises a comparison unit 501, a calculation unit 503, a transmission unit 505 and a process unit 507. In the first embodiment, the wireless communication apparatus may be another base station 107 in the wireless network 1 conforming to the IEEE802.16e wireless network standard and adopting the second power-saving mode as depicted in FIG. 1, or any other wireless communication apparatus capable of data scheduling.

Figure 6:
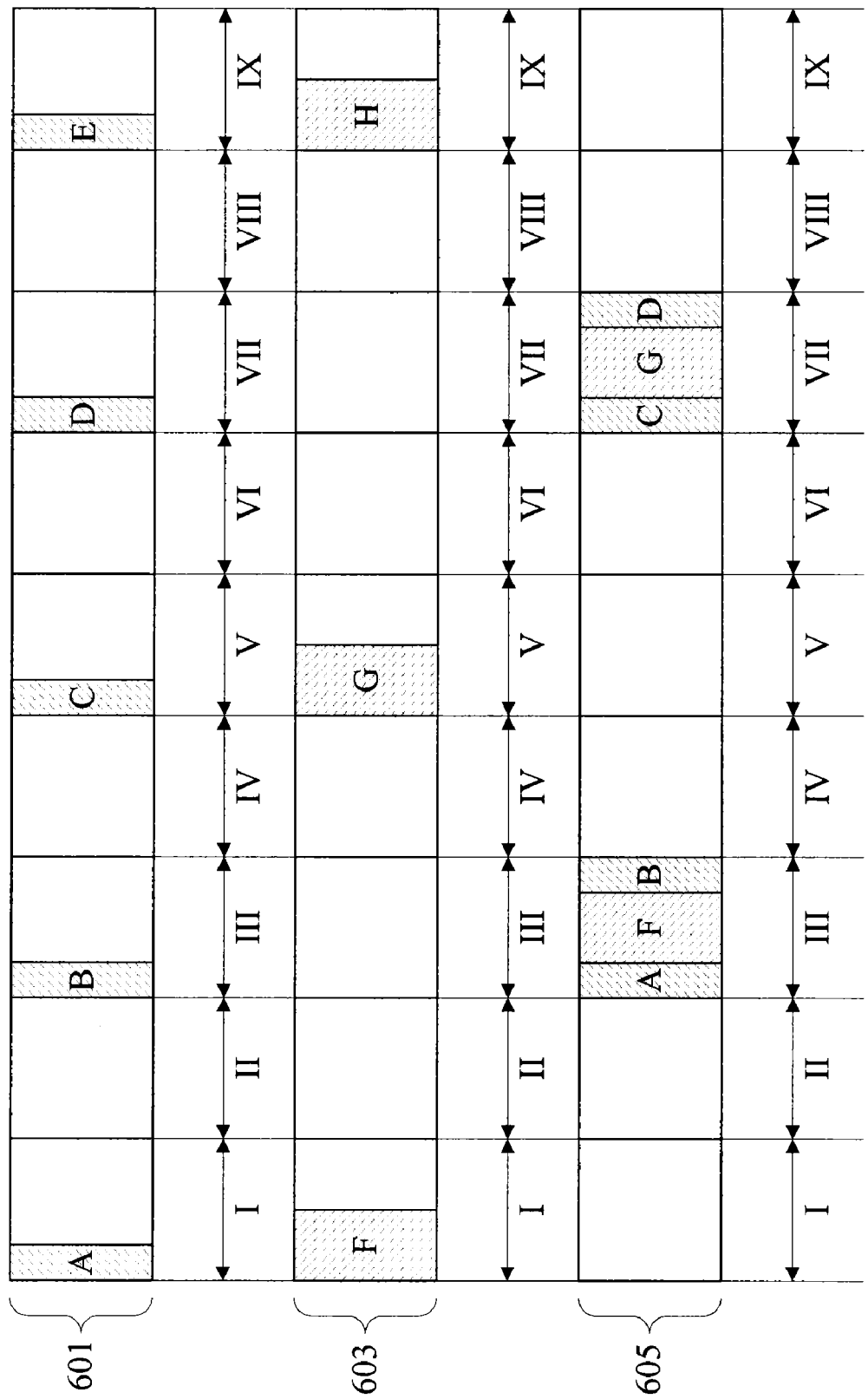
FIG. 6 is a schematic view illustrating the data transmission between a base station and a mobile station in the first embodiment.

FIG. 6 is a schematic view illustrating the data transmission between the base station 107 comprising the data scheduling module 5 and the first mobile station 103 in this embodiment. In this embodiment, the base station 107 is going to transmit a plurality of first data A, B, C, D, E of a first communication connection 601 and a plurality of second data F, G, H of a second communication connection 603 to the first mobile station 103, in which the first data A, B, C, D, E of the first communication connection 601 and the second data F, G, H of the second communication connection 603 are both to be transmitted in a plurality of frames I, II, III, . . . , IX. Each of the frames I, II, III, . . . , IX has a data transmission capacity 500 (i.e. the data amount each frame can transmit). In this embodiment, each frame can transmit four units, i.e., a data transmission capacity 500 is four.

The network equipment manufacturers or network service providers may set the data amount each frame can transmit, which will be readily appreciated by those of ordinary skill in the art and thus will not be further described herein.

In particular, the base station 107 will transmit the first data A, B, C, D, E of the first communication connection 601 in frames I, III, V, VII, IX at a first data transmission interval 502 of two frames (i.e. the frame length of the interval is two frames), and transmit the second data F, G, H of the second communication connection 603 in frames I, V, IX at the second data transmission interval 504 of four frames (i.e. the frame length of the interval is four frames).

Figure 7:
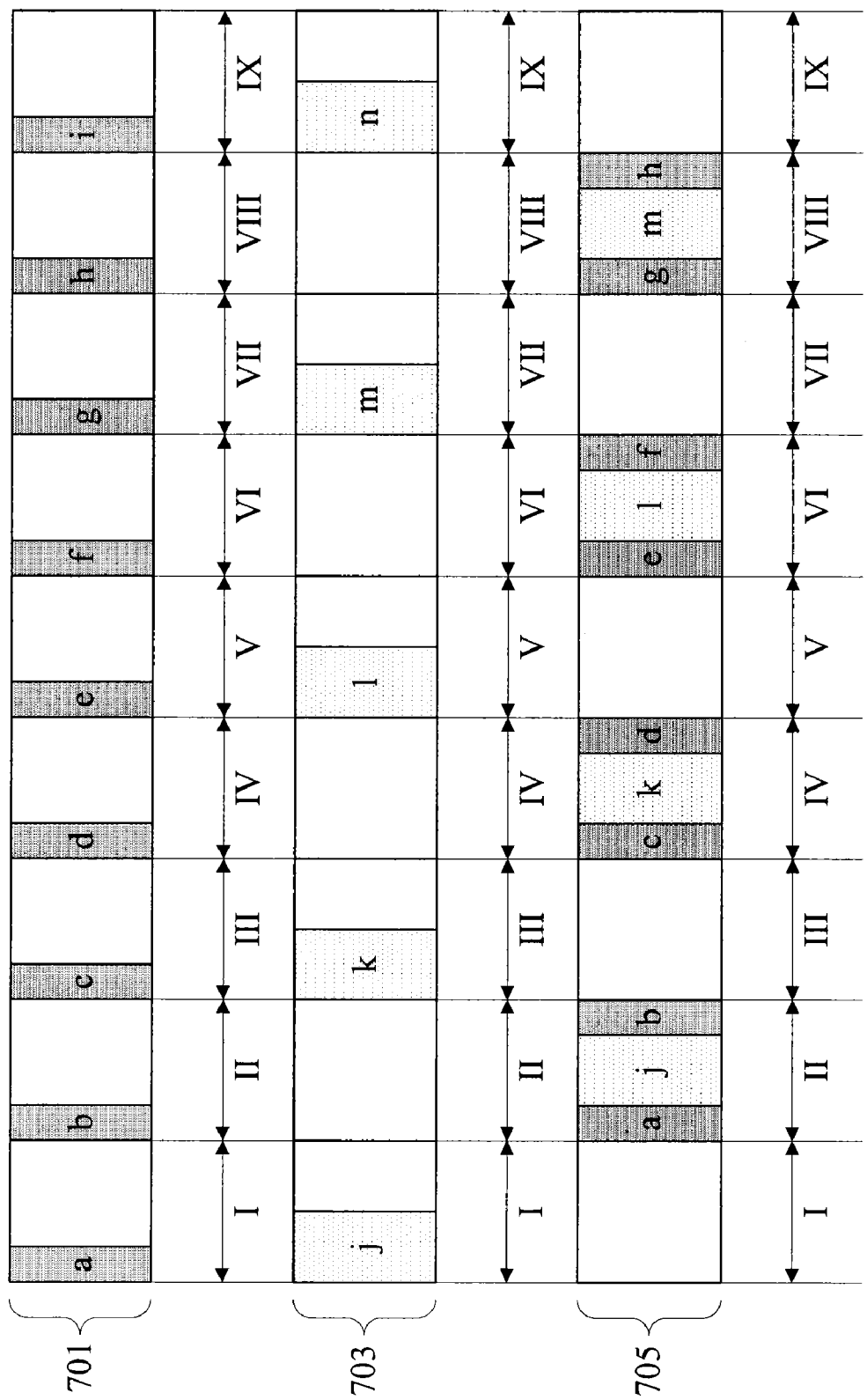
FIG. 7 is a schematic view illustrating the data transmission between the base station and another mobile station in the first embodiment.

FIG. 7 is a schematic view illustrating the data transmission between the base station 107 comprising the data scheduling module 5 and the second mobile station 105 in this embodiment. In this embodiment, the base station 107 is going to transmit a plurality of third data a, b, c, . . . , i of a third communication connection 701 and a plurality of fourth data j, k, l, m, n of a fourth communication connection 703 to the second mobile station 105, in which the third data a, b, c, . . . , i of the third communication connection 701 and the fourth data j, k, l, m, n of the fourth communication connection 703 are also to be transmitted in the aforesaid of frames I, II, III, . . . , IX.

In particular, the base station 101 will transmit the third data a, b, c, . . . , i of the third communication connection 701 in frames I, II, III, . . . , IX at a third data transmission interval 506 of one frame (i.e. the frame length of the interval is one frame), and transmit the fourth data j, k, l, m, n of the fourth communication connection 703 in frames I, III, V, VII, IX at a fourth data transmission interval 508 of two frames (i.e. the frame length of the interval is two frames).

The process unit 507 of the data scheduling module 5 sets a first delay constraint value 510 according to an attribute (not shown) of the first data A, B, C, D, E, sets a second delay constraint value 512 according to an attribute (not shown) of the second data F, G, H, sets a third delay constraint value 514 according to an attribute (not shown) of the third data a, b, c, . . . , i, and sets a fourth delay constraint value 516 according to an attribute (not shown) of the fourth data j, k, l, m, n.

A delay constraint value represents the maximum tolerance to delay in data transmissions. In this embodiment, the process unit 507 of the data scheduling module 5 sets the first delay constraint value 510 to be 4, which means that the base station 107 is allowed to transmit the first data of maximum delay of four frames. For example, the base station 107 is originally scheduled to transmit the first data A of the first communication connection 601 in frame I. Because the process unit 507 of the data scheduling module 5 has set the first delay constraint value 510 to be 4, the latest time at which the base station 107 is allowed to transmit the first data A is during frame IV. Also, the base station 107 is originally scheduled to transmit the first data C of the first communication connection 601 in the frame V, and because the first delay constraint value 510 has been set to be 4, the latest time at which the base station 107 is allowed to transmit the first data C is during frame VIII.

In this embodiment, apart from setting the first delay constraint value 510 to be 4, the process unit 507 of the data scheduling module 5 also sets the second delay constraint value 512 to be 8 according to the attribute of the second data F, G, H, sets the third delay constraint value 514 to be 2 according to the attribute of the third data a, b, c, . . . , i, and sets the fourth delay constraint value 516 to be 2 according to the attribute of the fourth data j, k, l, m, n respectively.

It should be appreciated that, this invention has no limitation on the magnitudes of the individual delay constraint values, and those of ordinary skill in the art may set delay constraint values of different magnitudes according to the attributes of the data.

Because both the first communication connection 601 and the second communication connection 603 are going to transmit data (i.e. the first data and the second data) to the first mobile station 103, the base station 107 will aggregate the first data and the second data. At this point, the comparison unit 501 compares the frame length (i.e. 2) of the first data transmission interval 502 with the frame length (i.e. 4) of the second data transmission interval 504.

When the frame length of the second data transmission interval 504 is not smaller than the frame length of the first data transmission interval 502, the calculation unit 503 sums the first data and the second data according to the second data transmission interval 504 which has a larger frame length. For example, the calculation unit 503 sums the first data A, B of the first communication connection 601 and the second data F of the second communication connection 603 contained in the frames I, II, III, IV to obtain a first summed data amount (i.e. 4). Then, the calculation unit 503 calculates a first average value (not shown) according to the second data transmission interval 504 (i.e. 4) and the first summed data amount (i.e. 4). According to the above calculations, the first average value is calculated by the calculation unit 503 to be 1.

Afterwards, the calculation unit 503 calculates a first aggregate data transmission interval 518 as follows:

$$\eta_1 = \frac{1}{\tau_1} \times \Omega \times T_{C1}$$

where $\eta_1$ represents the first aggregate data transmission interval 518, $\tau_1$ represents the first average value, $\Omega$ represents the data transmission capacity 500, and $T_{C1}$ represents a first integer adjusting value (not shown). The first integer adjusting value is a minimum value that can make the first aggregate data transmission interval 518 to be an integer. According to the aforesaid data (i.e. the first average value is 1 and the data transmission capacity 500 is 4), the first integer adjusting value is calculated by the calculation unit 503 to be 1, and the first aggregate data transmission interval 518 is calculated by the calculation unit 503 to be 4.

Afterwards, the base station 107 integrates the data A, B, C, . . . , H of the first communication connection 601 and the second communication connection 603 according to the aforesaid calculation results, and transmits these data in frames III and VII according to a first transmission time arrangement 605. In more detail, since the first delay constraint value 510 is smaller than the second delay constraint value 512, the transmission unit 505 will transmit the first data A, B, C, D, E of the first communication connection 601 and the second data F, G, H of the second communication connection 603 according to the first aggregate data transmission interval 518 (i.e. 4) and the first delay constraint value 510 (i.e. 4) in the first transmission time arrangement 605 to prevent the first data A, B, C, D, E of the first communication connection 601 from violating the respective delay constraint value (i.e. 4).

In particular, according to the first aggregate data transmission interval 518 (i.e. 4) and the first delay constraint value 510 (i.e. 4), the process unit 507 aggregates the first data A, B and the second data F into frame III or frame IV of the first transmission time arrangement 605 for transmission by the transmission unit 505. Meanwhile, the process unit 507 aggregates the first data C, D and the second data G into frame VII or frame VIII of the first transmission time arrangement 605 for transmission by the transmission unit 505. Because the first data A, B and the second data F can be designated by the process unit 507 to be transmitted in one of the frames III, IV, the frames III, IV are said to be a feasible slot. Likewise, because the first data C, D and the second data G can be designated by the process unit 507 to be transmitted in one of the frames VII, VIII, the frames VII, VIII are also said to be a feasible slot.

On the other hand, because both the third communication connection 701 and the fourth communication connection 703 are going to transmit data (i.e. the third data and the fourth data) to the second mobile station 105, the base station 107 will aggregate the third data and the fourth data. At this point, the comparison unit 501 compares the frame length (i.e. 1) of the third data transmission interval 506 with the frame length (i.e. 2) of the fourth data transmission interval 508.

When the frame length of the fourth data transmission interval 508 is not smaller than the frame length of the third data transmission interval 506, the calculation unit 503 sums the third data and the fourth data according to the fourth data transmission interval 508 which has a larger frame length. For example, the calculation unit 503 sums the third data a, b of the third communication connection 701 and the fourth data j of the fourth communication connection 703 contained in the frames I, II to obtain a second summed data amount (i.e. 4). Then, the calculation unit 503 calculates a second average value (not shown) according to the fourth data transmission interval 508 (i.e. 2) and the second summed data amount (i.e. 4). According to the above calculations, the second average value is calculated by the calculation unit 503 to be 2.

Afterwards, the calculation unit 503 calculates a second aggregate data transmission interval 522 according to the equation used previously to calculate the first aggregate data transmission interval 518 as follows:

$$\eta_2 = \frac{1}{\tau_2} \times \Omega \times T_{C2}$$

where $\eta_2$ represents the second aggregate data transmission interval 522, $\tau_2$ represents the second average value, $\Omega$ represents the data transmission capacity 500, and $T_{C2}$ represents a second integer adjusting value (not shown). The second integer adjusting value is a minimum value that can make the second aggregate data transmission interval 522 to be an integer. According to the aforesaid data (i.e. the second average value is 2 and the data transmission capacity 500 is 4), the second integer adjusting value is calculated by the calculation unit 503 to be 1, and the second aggregate data transmission interval 522 is calculated by the calculation unit 503 to be 2.

Afterwards, the base station 107 integrates the data a, b, c, . . . , n of the third communication connection 701 and the fourth communication connection 703 according to the aforesaid calculation results, and transmits these data in the frames II, IV, VI and VIII according to a second transmission time arrangement 705. In more detail, since the third delay constraint value 514 is equal to the fourth delay constraint value 516, the transmission unit 505 will transmit the third data a, b, e, . . . , i of the third communication connection 701 and the fourth data j, k, l, m, n of the fourth communication connection 703 according to the second aggregate data transmission interval 522 (i.e. 2) and either the third delay constraint value 514 or the fourth delay constraint value 516 (i.e. 2) in the second transmission time arrangement 705, to prevent the third data a, b, e, . . . , i of the third communication connection 701 or the fourth data j, k, l, m, n of the fourth communication connection 703 from violating the respective delay constraint value (i.e. 2).

In particular, according to the second aggregate data transmission interval 522 (i.e. 2) and either the third delay constraint value 514 or the fourth delay constraint value 516 (i.e. 2), the process unit 507 aggregates the third data a, b and the fourth data j into frame II of the second transmission time arrangement 705 for transmission by the transmission unit 505; aggregates the third data c, d and the fourth data k into frame IV of the second transmission time arrangement 705 for transmission by the transmission unit 505; aggregates the third data e, f and the fourth data l into frame VI of the second transmission time arrangement 705 for transmission by the transmission unit 505; and aggregates the third data g, h and the fourth data m into frame VIII of the second transmission time arrangement 705 for transmission by the transmission unit 505.

Because the third data a, b and the fourth data j are designated by the process unit 507 to be transmitted only in a single frame II; the third data c, d and the fourth data k are designated to be transmitted only in a single frame IV; the third data e, f and the fourth data l are designated to be transmitted only in a single frame VI; and the third data g, h and the fourth data m are designated to be transmitted only in a single frame VIII, the second transmission time arrangement 705 comprises the feasible slot with the size of one frame.

According to the above descriptions, the first mobile station 103 will have the antenna module thereof powered off during unused frames (i.e. frames I, II, IV, V, VI, VIII, IX) of the first transmission time arrangement 605, and the second mobile station 105 will have the antenna module thereof powered off during unused frames (i.e. frames I, III, V, VII, IX) of the second transmission time arrangement 705. Hence, with the data scheduling module 5 of this embodiment, the wireless communication apparatus (e.g. the base station 107) may aggregate the data to be transmitted in a single frame and leave more frames unused, thereby conserving power by prolonging the time durations in which the mobile stations 103, 105 have their antenna modules powered off.

Figure 8:
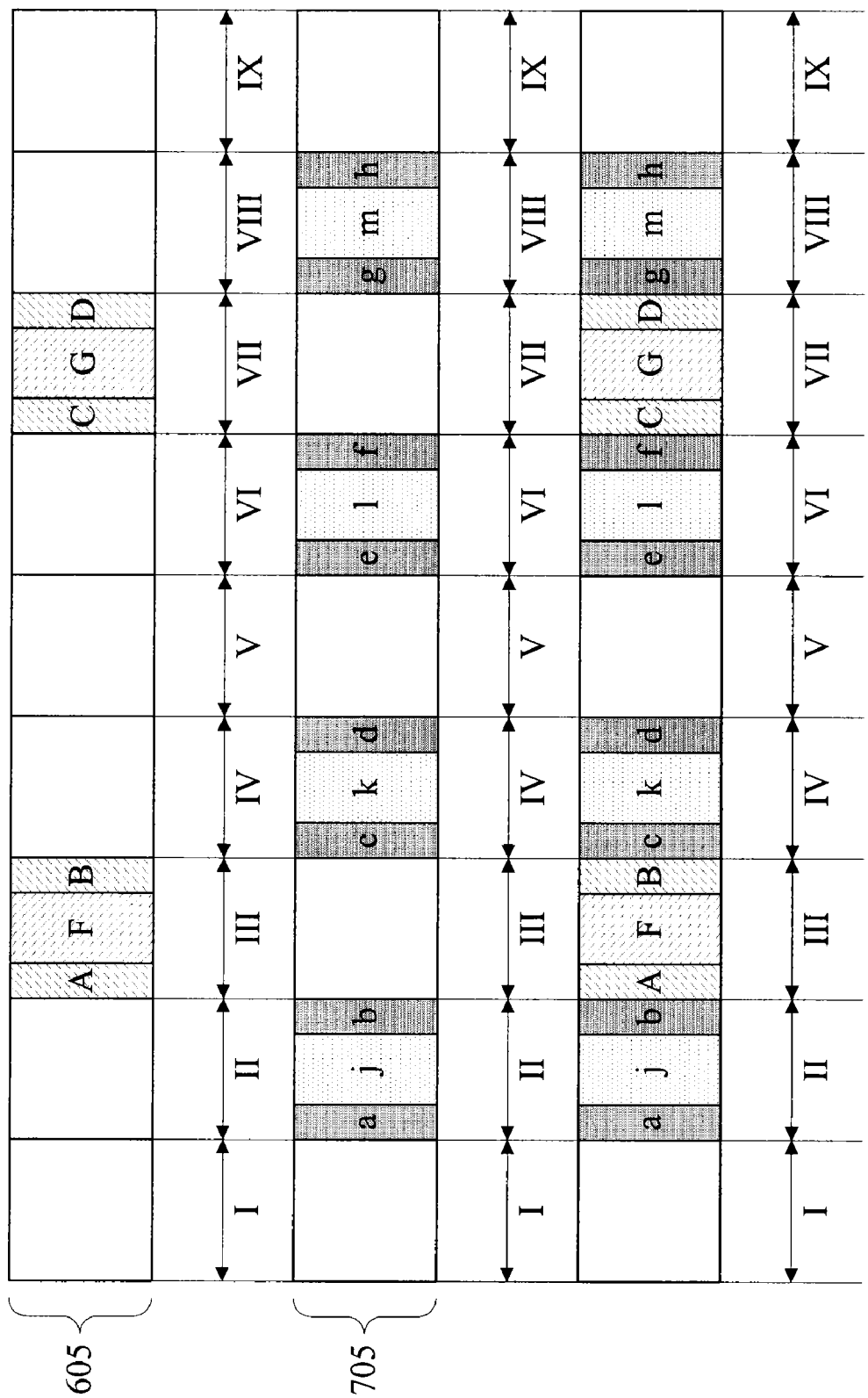
FIG. 8 is a schematic view illustrating the data transmission between the base station and the two mobile stations in the first embodiment.

Afterwards, according to the data transmission capacity 500 of the frames and the aforesaid feasible slots, the calculation unit 503 arranges transmission of the data A, B, C, . . . , H of the first mobile station 103 and the data a, b, c, . . . , n of the second mobile station 105 through the maximum flow algorithm. As depicted in FIG. 8, when processing all the aforesaid data (i.e. the first, the second, the third and the fourth data), the calculation unit 503 arranges the data a, b, j of the second transmission time arrangement 705 in frame II; arranges the data A, F, B of the first transmission time arrangement 605 in frame III; arranges the data c, k, d of the second transmission time arrangement 705 in frame IV; arranges the data e, l, f of the second transmission time arrangement 705 in frame VI; arranges the data C, G, D of the first transmission time arrangement 605 in frame VII; and arranges the data g, m, h of the second transmission time arrangement 705 in frame VIII.

In this way, by using the feasible slots and the maximum flow algorithm, the wireless communication apparatus (e.g. the base station 107) using the data scheduling module 5 of this embodiment is provided with improved capability to process data of a plurality of mobile stations in sleep mode. This prevents the mobile stations from being forced to leave the sleep mode due to an inadequate scheduling capability. The operations of the maximum flow algorithm will be readily appreciated by those of ordinary skill in the art based on basic theories of general data scheduling and, thus, will not be further described herein.

Additionally, although the first embodiment only illustrated the data transmissions from the base stations to the mobile stations, this invention is not merely limited thereto; i.e., the operations of data transmissions from the mobile stations to the base stations will be readily appreciated by those of ordinary skill in the art based on the above description and, thus, will not be further described herein.

Figure 9A:
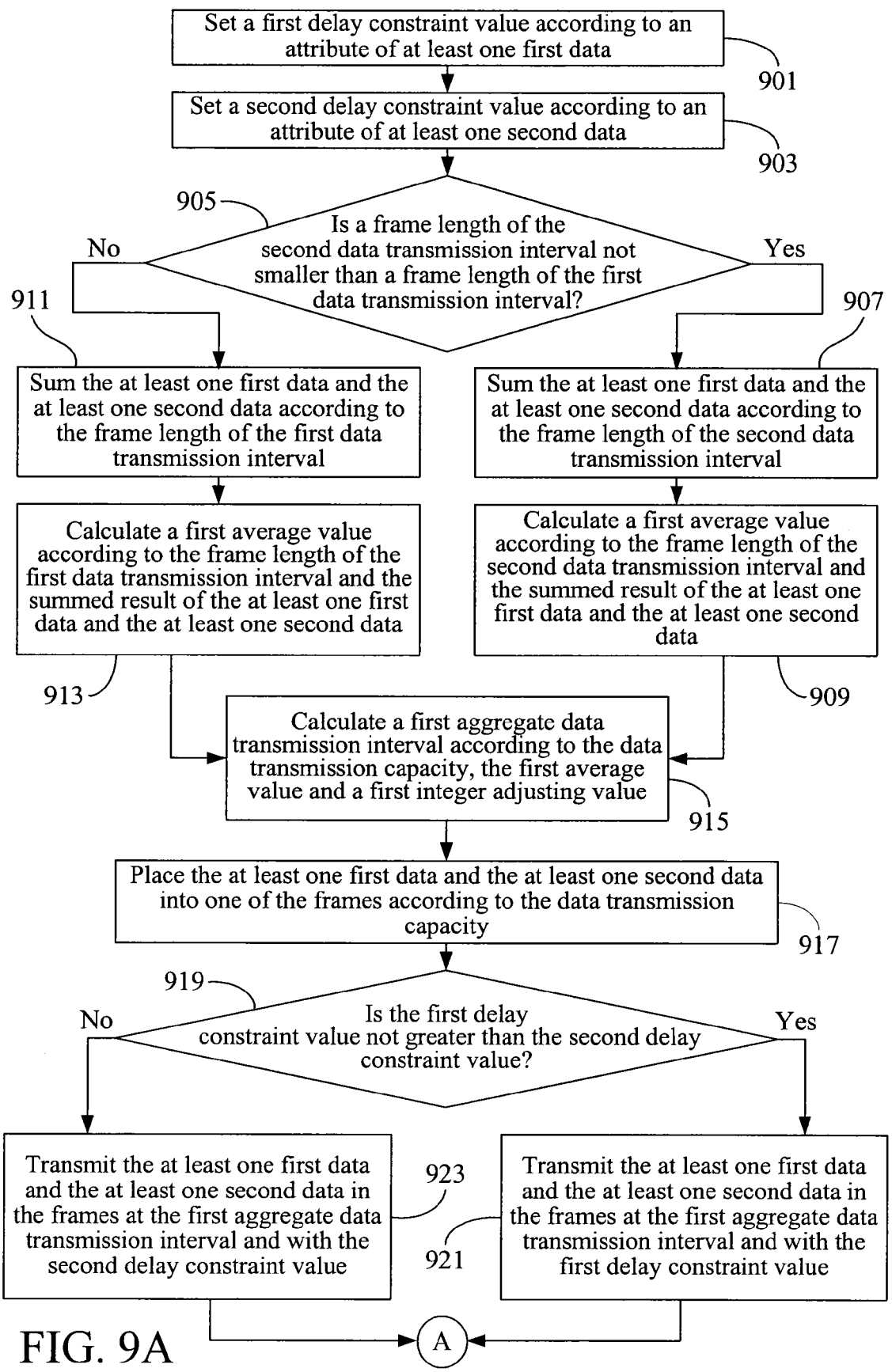
FIG. 9A to 9C are a flowchart of a second embodiment of this invention.
Figure 9B:
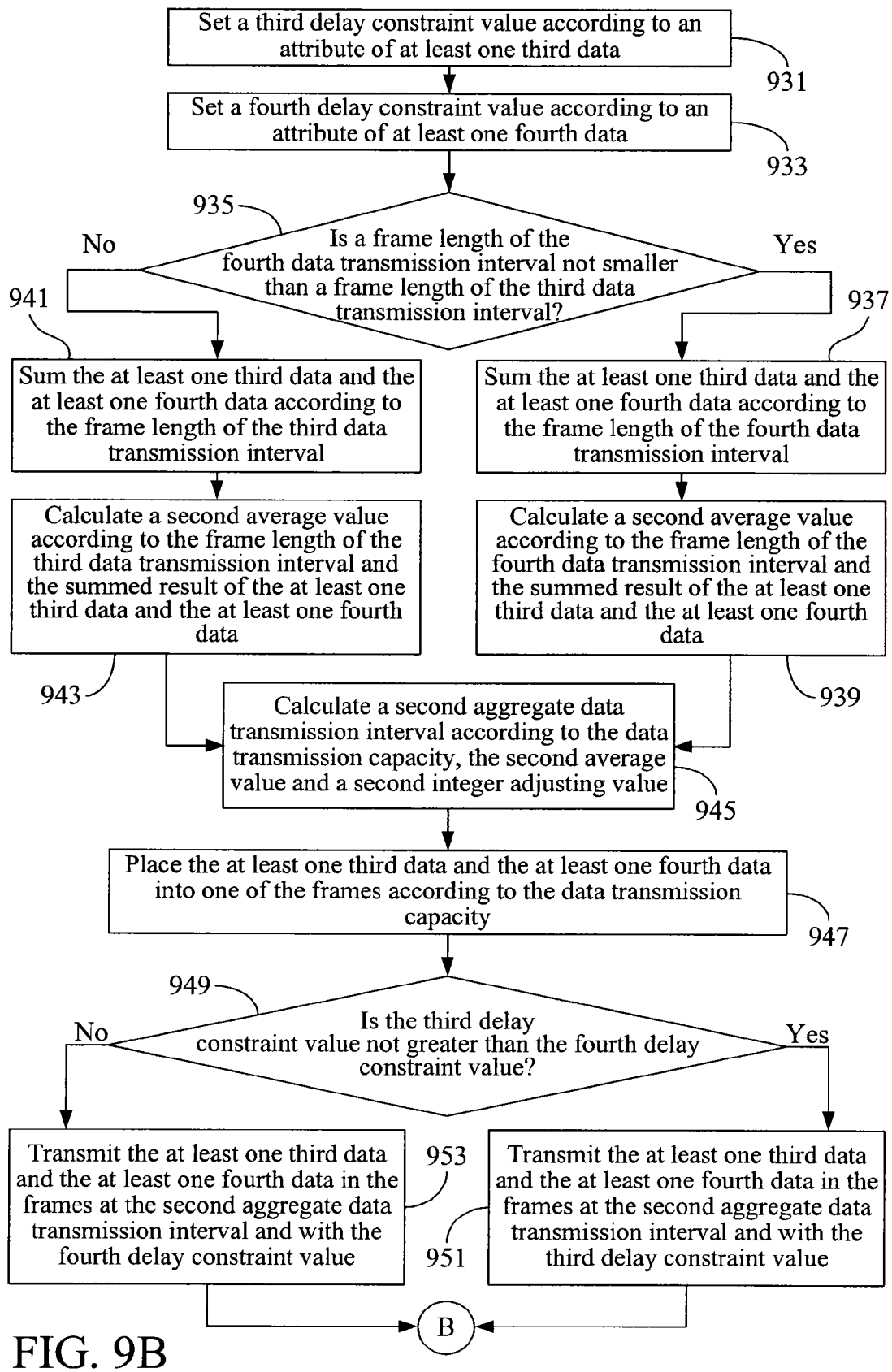
Figure 9C:
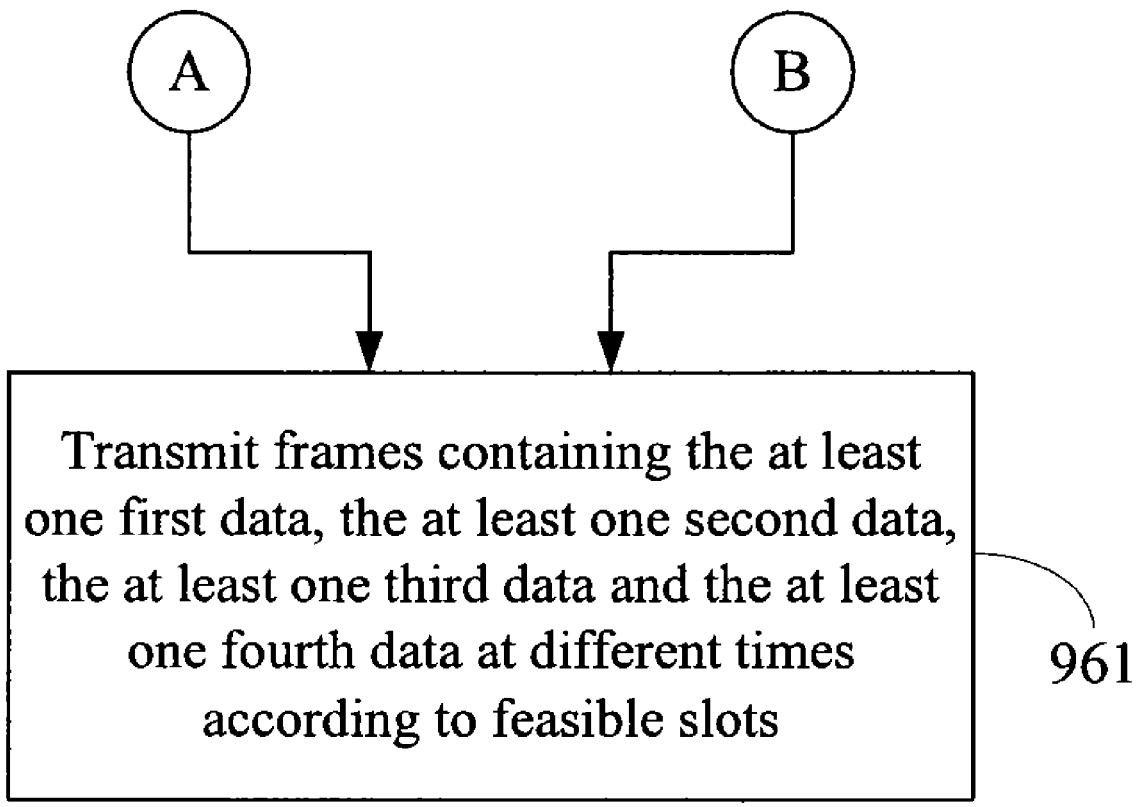

FIGS. 9A through 9C depict a second embodiment of this invention, which is a data scheduling method. The data scheduling method is adapted for use in a data scheduling module 5, such as the data scheduling module 5 for a wireless communication apparatus described in the first embodiment. The wireless communication apparatus transmits at least one first data at the first data transmission interval in a plurality of frames and at least one second data at a second data transmission interval in a plurality of frames to a first mobile station. Also, the wireless communication apparatus transmits at least one third of the data in the third data transmission interval in the plurality of frames and at least one fourth data in the fourth data transmission interval in the plurality of frames to a second mobile station. Each of the frames has a data transmission capacity.

More specifically, the data scheduling method of the second embodiment may be implemented by a computer program product. When the computer program product is loaded into the data scheduling module 5 via a computer and a plurality of codes of the computer program product is executed, the data scheduling method of the second embodiment can be accomplished. This computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In the second embodiment, the scheduling associated with the at least one first data and the at least one second data comprises the following steps as depicted in FIG. 9A. Initially, step 901 is executed to set a first delay constraint value according to an attribute of the at least one first data, and step 903 is executed to set a second delay constraint value according to an attribute of the at least one second data. Next, step 905 is executed to compare a frame length of the first data transmission interval and a frame length of the second data transmission interval. If the frame length of the second data transmission interval is not smaller than the frame length of the first data transmission interval, step 907 is executed to sum the at least one first data and the at least one second data according to the frame length of the second data transmission interval. Afterwards, step 909 is executed to calculate a first average value according to the frame length of the second data transmission interval and the summed result of step 907.

On the other hand, if the frame length of the second data transmission interval is smaller than the frame length of the first data transmission interval, step 911 is executed to sum the at least one first data and the at least one second data according to the frame length of the first data transmission interval. Afterwards, step 913 is executed to calculate the first average value according to the frame length of the first data transmission interval and the summed result of step 911.

After the first average value is calculated, step 915 is executed to calculate a first aggregate data transmission interval according to the data transmission capacity, the first average value and a first integer adjusting value. Then, step 917 is executed to place the at least one first data and the at least one second data into one of the frames according to the data transmission capacity. Thereafter, step 919 is executed to compare the first delay constraint value and the second delay constraint value. If the first delay constraint value is not greater than the second delay constraint value, step 921 is executed to transmit the at least one first data and the at least one second data in the frames at the first aggregate data transmission interval and with the first delay constraint value. Otherwise, if it is determined in step 919 that the first delay constraint value is greater than the second delay constraint value, step 923 is executed to transmit the at least one first data and the at least one second data in the frames at the first aggregate data transmission interval and with the second delay constraint value.

In the second embodiment, the scheduling associated with the at least one third data and the at least one fourth data comprises the following steps as depicted in FIG. 9B. Initially, step 931 is executed to set a third delay constraint value according to an attribute of the at least one third data, and step 933 is executed to set a fourth delay constraint value according to an attribute of the at least one fourth data. Next, step 935 is executed to compare a frame length of the third data transmission interval and a frame length of the fourth data transmission interval. If the frame length of the fourth data transmission interval is not smaller than the frame length of the third data transmission interval, step 937 is executed to sum the at least one third data and the at least one fourth data according to the frame length of the fourth data transmission interval. Afterwards, step 939 is executed to calculate a second average value according to the frame length of the fourth data transmission interval and the summed result of step 937.

On the other hand, if the frame length of the fourth data transmission interval is smaller than the frame length of the third data transmission interval, step 941 is executed to sum the at least one third data and the at least one fourth data according to the frame length of the third data transmission interval. Afterwards, step 943 is executed to calculate the second average value according to the frame length of the third data transmission interval and the summed result of step 941.

After the second average value is calculated, step 945 is executed to calculate a second aggregate data transmission interval according to the data transmission capacity, the second average value and a second integer adjusting value. Then, step 947 is executed to place the at least one third data and the at least one fourth data into one of the frames according to the data transmission capacity. Thereafter, step 949 is executed to compare the third delay constraint value and the fourth delay constraint value. If the third delay constraint value is not greater than the fourth delay constraint value, step 951 is executed to transmit the at least one third data and the at least one fourth data in the frames at the second aggregate data transmission interval and with the third delay constraint value. Otherwise, if it is determined in step 949 that the third delay constraint value is greater than the fourth delay constraint value, step 953 is executed to transmit the at least one third data and the at least one fourth data in the frames at the second aggregate data transmission interval and with the fourth delay constraint value.

In reference to FIG. 9C, when the wireless communication apparatus comprises the data scheduling module 5 and is ready to process the at least one first data, the at least one second data, the at least one third data and the at least one fourth data for transmission, the data scheduling method proceeds to step 961 to transmit the frames containing the at least one first data, the at least one second data, the at least one third data and the at least one fourth data at different times according to the feasible slots.

In addition to the aforesaid steps, the second embodiment can also execute the operations and functions set forth with respect to the data scheduling module 5 of the first embodiment. The methods in which the second embodiment executes these operations and functions will be readily appreciated by those of ordinary skill in the art based on the explanation of the first embodiment and, thus, will not be further described herein.

According to the above descriptions, by integrating the data to be transmitted through individual frames in different connections of the mobile stations, the data scheduling module, method and computer program product thereof of this invention reduces the number of times that the mobile stations power on the antenna modules during the sleep mode, thereby achieving power-saving. Moreover, this invention enhances the capability of a base station to process the data of a plurality of mobile stations in sleep mode, so the case in which the mobile stations are forced to leave the sleep mode due to inadequate data scheduling capability of the base station is further avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data scheduling method for a wireless communication apparatus, wherein the wireless communication apparatus transmits at least one first data at a first data transmission interval in a plurality of frames and transmits at least one second data at a second data transmission interval in the plurality of frames, and each of the frames has a data transmission capacity, the data scheduling method comprising the steps of:
    determining that a frame length of the second data transmission interval is not smaller than a frame length of the first data transmission interval;
    summing the at least one first data and the at least one second data according to the frame length of the second data transmission interval;
    calculating, by the wireless communication apparatus, a first average value according to the frame length of the second data transmission interval and the summed result of the at least one first data and the at least one second data;
    calculating a first aggregate data transmission interval according to the data transmission capacity, the first average value and a first integer adjusting value; and transmitting the at least one first data and the at least one second data at the first aggregate data transmission interval in the plurality of frames.

2. The data scheduling method of claim 1, wherein the step of calculating the first aggregate data transmission interval further comprises the step of:
   calculating the first aggregate data transmission interval according to the following equation:

$$\eta = \frac{1}{\tau} \times \Omega \times T_C$$

where $\eta$ represents the first aggregate data transmission interval, $\tau$ represents the first average value, $\Omega$ represents the data transmission capacity, and $T_C$ represents the first integer adjusting value.

3. The data scheduling method of claim 1, further comprising the steps of:
   setting a first delay constraint value according to an attribute of the at least one first data;
   setting a second delay constraint value according to an attribute of the at least one second data; and
   determining that the first delay constraint value is not greater than the second delay constraint value;
   wherein the at least one first data and the at least one second data are transmitted in the plurality of frames according to the first delay constraint value and at the first aggregate data transmission interval.

4. The data scheduling method of claim 3, wherein the wireless communication apparatus further transmits at least one third data at a third data transmission interval in the plurality of frames and at least one fourth data at a fourth data transmission interval in the plurality of frames, the data scheduling method further comprising the steps of:
   determining that a frame length of the fourth data transmission interval is not smaller than a frame length of the third data transmission interval;
   summing the at least one third data and the at least one fourth data according to the frame length of the fourth data transmission interval;
   calculating a second average value according to the frame length of the fourth data transmission interval and the summed result of the at least one third data and the at least one fourth data;
   calculating a second aggregate data transmission interval according to the data transmission capacity, the second average value and a second integer adjusting value; and
   transmitting the at least one third data and the at least one fourth data in the plurality of frames at the second aggregate data transmission interval.

5. The data scheduling method of claim 4, wherein the step of calculating the second aggregate data transmission interval further comprises the step of:
   calculating the second aggregate data transmission interval according to the following equation:

$$\eta = \frac{1}{\tau} \times \Omega \times T_C$$

where $\eta$ represents the second aggregate data transmission interval, $\tau$ represents the second average value, $\Omega$ represents the data transmission capacity, and $T_C$ represents the second integer adjusting value.

6. The data scheduling method of claim 4, wherein the at least one first data and the at least one second data are transmitted to a first mobile apparatus, and the at least one third data and the at least one fourth data are transmitted to a second mobile apparatus.

7. The data scheduling method of claim 4, further comprising the steps of:
   setting a third delay constraint value according to an attribute of the at least one third data;
   setting a fourth delay constraint value according to an attribute of the at least one fourth data; and
   determining that the third delay constraint value is not greater than the fourth delay constraint value;
   wherein the at least one third data and the at least one fourth data are transmitted in the plurality of frames according to the third delay constraint value and at the second aggregate data transmission interval.

8. The data scheduling method of claim 4, further comprising the steps of:
   placing the at least one first data and the at least one second data into one of the plurality of frames according to the data transmission capacity;
   placing the at least one third data and the at least one fourth data into one of the plurality of frames according to the data transmission capacity; and
   transmitting the frame containing the at least one first data and the at least one second data, as well as the frame containing the at least one third data and the at least one fourth data at different times according to a feasible slot.

9. An apparatus comprising a data scheduling module, wherein the apparatus transmits at least one first data at a first data transmission interval in a plurality of frames and transmits at least one second data at a second data transmission interval in the plurality of frames, and each of the frames has a data transmission capacity, the data scheduling module comprising:
   a comparison unit, being configured to compare a frame length of the second data transmission interval with a frame length of the first data transmission interval;
   a calculation unit, being configured to, if the frame length of the second data transmission interval is not smaller than the frame length of the first data transmission interval, sum the at least one first data and the at least one second data according to the frame length of the second data transmission interval, calculate a first average value according to the frame length of the second data transmission interval and the summed result of the at least one first data and the at least one second data, and calculate a first aggregate data transmission interval according to the data transmission capacity, the first average value and a first integer adjusting value; and
   a transmission unit, being configured to transmit the at least one first data and the at least one second data in the plurality of frames at the first aggregate data transmission interval.

10. The data scheduling module of claim 9, wherein the calculation unit is configured to calculate the first aggregate data transmission interval according to the following equation:

$$\eta = \frac{1}{\tau} \times \Omega \times T_C$$

where $\eta$ represents the first aggregate data transmission interval, $\tau$ represents the first average value, $\Omega$ represents the data transmission capacity, and $T_C$ represents the first integer adjusting value.

11. The data scheduling module of claim 9, further comprising a process unit being configured to set a first delay constraint value according to an attribute of the at least one first data and set a second delay constraint value according to an attribute of the at least one second data, wherein the comparison unit determines that the first delay constraint value is not greater than the second delay constraint value, and the transmission unit transmits the at least one first data and the at least one second data in the plurality of frames according to the first delay constraint value and at the first aggregate data transmission interval.

12. The data scheduling module of claim 11, wherein the wireless communication apparatus further transmits at least one third data at a third data transmission interval in the plurality of frames and at least one fourth data at a fourth data transmission interval in the plurality of frames, wherein:
the comparison unit is configured to compare a frame length of the fourth data transmission interval with a frame length of the third data transmission interval;
the calculation unit is configured to, if the frame length of the fourth data transmission interval is not smaller than the frame length of the third data transmission interval, sum the at least one third data and the at least one fourth data according to the frame length of the fourth data transmission interval, calculate a second average value according to the frame length of the fourth data transmission interval and the summed result of the at least one third data and the at least one fourth data, and calculate a second aggregate data transmission interval according to the data transmission capacity, the second average value and a second integer adjusting value; and
the transmission unit is configured to transmit the at least one third data and the at least one fourth data in the plurality of frames at the second aggregate data transmission interval.

13. The data scheduling module of claim 12, wherein the calculation unit is configured to calculate the second aggregate data transmission interval according to the following equation:

$$\eta = \frac{1}{\tau} \times \Omega \times T_C$$

where η represents the second aggregate data transmission interval, τ represents the second average value, Ω represents the data transmission capacity, and $T_C$ represents the second integer adjusting value.

14. The data scheduling module of claim 12, wherein the at least one first data and the at least one second data are transmitted to a first mobile apparatus, and the at least one third data and the at least one fourth data are transmitted to a second mobile apparatus.

15. The data scheduling module of claim 12, wherein the process unit is configured to set a third delay constraint value according to an attribute of the at least one third data and set a fourth delay constraint value according to an attribute of the at least one fourth data, the comparison unit is configured to determine that the third delay constraint value is not greater than the fourth delay constraint value, and the transmission unit is configured to transmit the at least one third data and the at least one fourth data in the plurality of frames according to the third delay constraint value and at the second aggregate data transmission interval.

16. The data scheduling module of claim 12, wherein the process unit is configured to place the at least one first data and the at least one second data into one of the plurality of frames according to the data transmission capacity and place the at least one third data and the at least one fourth data into one of the plurality of frames according to the data transmission capacity, and the transmission unit is configured to transmit the frame containing the at least one first data and the at least one second data, as well as the frame containing the at least one third data and the at least one fourth data at different times according to a feasible slot.

17. A computer program product storing a program on a non-transitory, machine-readable medium, which when executed by a wireless communication apparatus causes the wireless communication apparatus to transmit at least one first data at a first data transmission interval in a plurality of frames and transmits at least one second data at a second data transmission interval in the plurality of frames, and each of the frames has a data transmission capacity, the program comprising:
a code A for a comparison unit to determine that a frame length of the second data transmission interval is not smaller than a frame length of the first data transmission interval;
a code B for a calculation unit to sum the at least one first data and the at least one second data according to the frame length of the second data transmission interval;
a code C for the calculation unit to calculate a first average value according to the frame length of the second data transmission interval and the summed result of the at least one first data and the at least one second data;
a code D for the calculation unit to calculate a first aggregate data transmission interval according to the data transmission capacity, the first average value and a first integer adjusting value; and
a code E for a transmission unit to transmit the at least one first data and the at least one second data in the plurality of frames at the first aggregate data transmission interval.

18. The computer program product of claim 17, wherein the code D further comprises:
a code D1 for the calculation unit to calculate the first aggregate data transmission interval according to the following equation:

$$\eta = \frac{1}{\tau} \times \Omega \times T_C$$

where η represents the first aggregate data transmission interval, τ represents the first average value, Ω represents the data transmission capacity, and $T_C$ represents the first integer adjusting value.

19. The computer program product of claim 17, wherein the program further comprises:
a code F for a process unit to set a first delay constraint value according to an attribute of the at least one first data;
a code G for the process unit to set a second delay constraint value according to an attribute of the at least one second data; and
a code H for the comparison unit to determine that the first delay constraint value is not greater than the second delay constraint value;
a code I for the transmission unit to transmit the at least one first data and the at least one second data in the plurality of frames according to the first delay constraint value and at the first aggregate data transmission interval.

20. The computer program product of claim 19, wherein the wireless communication apparatus further transmits at least one third data at a third data transmission interval in the plurality of frames and at least one fourth data at a fourth data transmission interval in the plurality of frames, and the program further comprises:
- a code J for the comparison unit to determine that a frame length of the fourth data transmission interval is not smaller than a frame length of the third data transmission interval;
- a code K for the calculation unit to sum the at least one third data and the at least one fourth data according to the frame length of the fourth data transmission interval;
- a code L for the calculation unit to calculate a second average value according to the frame length of the fourth data transmission interval and the summed result of the at least one third data and the at least one fourth data;
- a code M for the calculation unit to calculate a second aggregate data transmission interval according to the data transmission capacity, the second average value and a second integer adjusting value; and
- a code N for the transmission unit to transmit the at least one third data and the at least one fourth data in the plurality of frames at the second aggregate data transmission interval.

21. The computer program product of claim 20, wherein the code M further comprises:
- a code M1 for the calculation unit to calculate the second aggregate data transmission interval according to the following equation:

$$\eta = \frac{1}{\tau} \times \Omega \times T_C$$

where $\eta$ represents the second aggregate data transmission interval, $\tau$ represents the second average value, $\Omega$ represents the data transmission capacity, and $T_C$ represents the second integer adjusting value.

22. The computer program product of claim 20, wherein the at least one first data and the at least one second data are transmitted to a first mobile apparatus, and the at least one third data and the at least one fourth data are transmitted to a second mobile apparatus.

23. The computer program product of claim 20, wherein the program further comprises:
- a code O for the process unit to set a third delay constraint value according to an attribute of the at least one third data;
- a code P for the process unit to set a fourth delay constraint value according to an attribute of the at least one fourth data; and
- a code Q for the comparison unit to determine that the third delay constraint value is not greater than the fourth delay constraint value;
- a code R for the transmission unit to transmit the at least one third data and the at least one fourth data in the plurality of frames according to the third delay constraint value and at the second aggregate data transmission interval.

24. The computer program product of claim 20, wherein the program further comprises:
- a code U for the process unit to place the at least one first data and the at least one second data into one of the plurality of frames according to the data transmission capacity;
- a code V for the process unit to place the at least one third data and the at least one fourth data into one of the plurality of frames according to the data transmission capacity; and
- a code W for the transmission unit to transmit the frame containing the at least one first data and the at least one second data, as well as the frame containing the at least one third data and the at least one fourth data at different times according to a feasible slot.

* * * * *